United States Patent
Fukumoto et al.

(10) Patent No.: US 7,606,133 B2
(45) Date of Patent: Oct. 20, 2009

(54) HOLOGRAM RECORDING/REPRODUCING DEVICE AND HOLOGRAM REPRODUCING DEVICE

(75) Inventors: Atsushi Fukumoto, Kanagawa (JP); Kenji Tanaka, Tokyo (JP); Koji Ishioka, Kanagawa (JP)

(73) Assignee: Sony Corporation (JP)

( * ) Notice: Subject to any disclaimer, the term of this patent is extended or adjusted under 35 U.S.C. 154(b) by 466 days.

(21) Appl. No.: 11/527,836

(22) Filed: Sep. 27, 2006

(65) Prior Publication Data
US 2007/0104069 A1    May 10, 2007

(30) Foreign Application Priority Data
Sep. 30, 2005    (JP)    ............... P2005-287760

(51) Int. Cl.
*G11B 7/00* (2006.01)
*G03H 1/00* (2006.01)

(52) U.S. Cl. ...................................... 369/103
(58) Field of Classification Search ........................ None
See application file for complete search history.

(56) References Cited

U.S. PATENT DOCUMENTS

| | | | |
|---|---|---|---|
| 4,993,789 A * | 2/1991 | Biles et al. ............... | 359/15 |
| 6,108,110 A | 8/2000 | Orlov et al. | |
| 6,452,890 B2 * | 9/2002 | Kawano et al. ......... | 369/110.01 |
| 7,023,786 B2 * | 4/2006 | Itoh et al. ............... | 369/103 |
| 2003/0035161 A1 * | 2/2003 | Anderson ............... | 359/35 |

OTHER PUBLICATIONS

Holographic Media Coming Soon, Achievement of 200G Bits in 2006, Nikkei Electronics, pp. 106-114, Jan. 17, 2005.

\* cited by examiner

*Primary Examiner*—Peter Vincent Agustin
(74) *Attorney, Agent, or Firm*—Lerner, David, Littenberg, Krumholz & Mentlik, LLP

(57) ABSTRACT

A hologram recording/reproducing device records information onto a medium by a light beam emitted from a laser light source and passing through a forward path, the forward path having optical components in an area extending from the laser light source to the medium, and reproduces the recorded information by the light beam passing through a backward path, the backward path having optical components in an area extending from the medium to an array light detector. The device includes a spatial-light modulator and a first objective lens disposed in the forward path, and a second objective lens and a polarization-dependent diffraction element disposed in the backward path. The modulator generates signal light and reference light from the light beam emitted from the laser light source, the signal light and the reference light being spatially divided from each other and having a common light path. The first objective lens focuses the signal light and the reference light from the modulator onto the medium. The second objective lens forms a hologram image on the light detector based on reproduction light from the medium. The diffraction element is disposed in a hologram real-image plane and diffracts the reference light incident upon the light detector from the second objective lens.

7 Claims, 7 Drawing Sheets

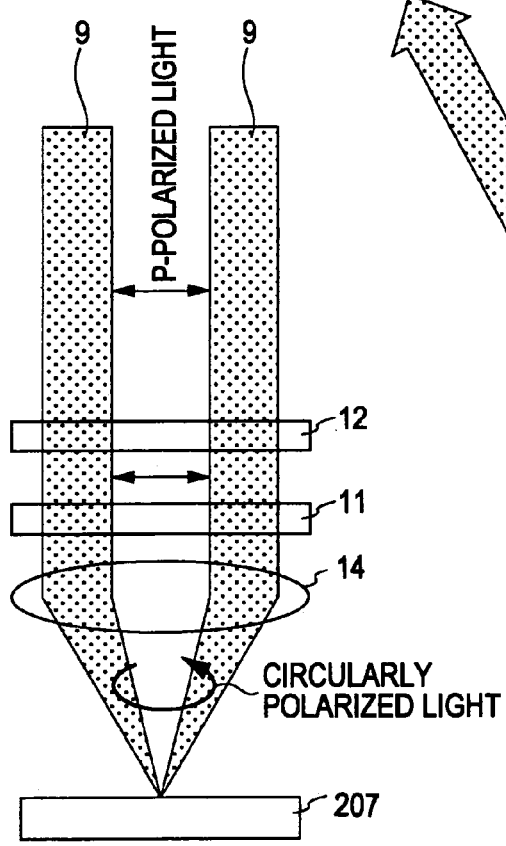
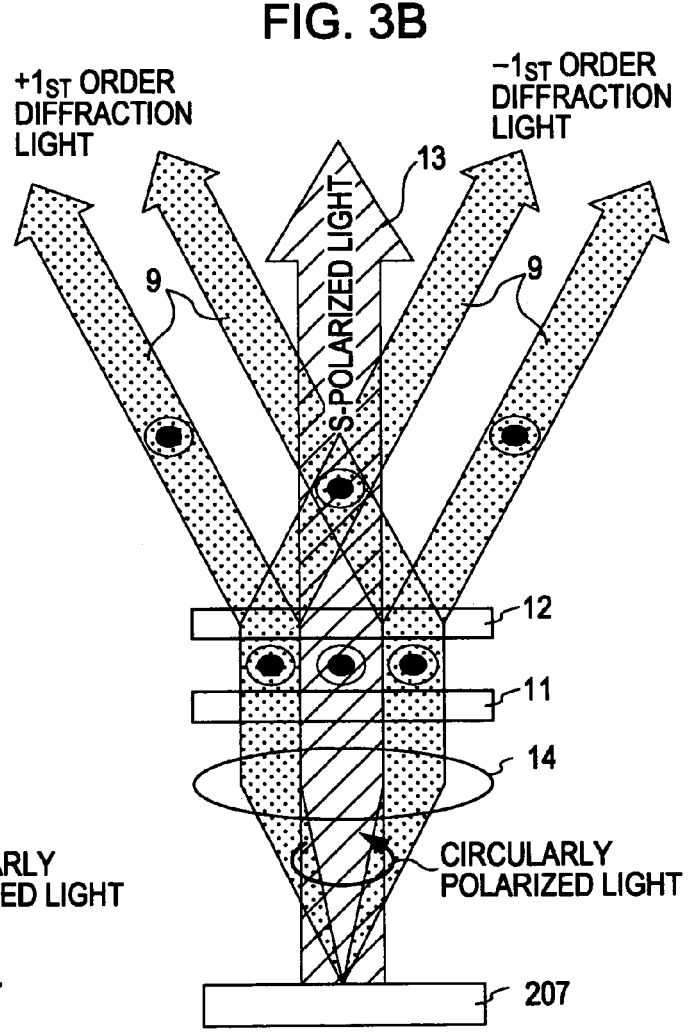
FIG. 3A
FIG. 3B

HOLOGRAM RECORDING/REPRODUCING DEVICE AND HOLOGRAM REPRODUCING DEVICE

CROSS-REFERENCE TO RELATED APPLICATIONS

The present application claims priority from Japanese Patent Application No. JP 2005-287760 on Sep. 30, 2005, the disclosure of which is hereby incorporated by reference herein.

BACKGROUND OF THE INVENTION

1. Field of the Invention

The present invention relates to a hologram recording/reproducing device and a hologram reproducing device.

2. Description of the Related Art

A hologram recording device and a hologram recording method, used for recording data using holography, are proposed. In the device and method, reference light and signal light, modulated by information to be recorded (record data), are generated by the same laser light source, and are used to irradiate a hologram recording/reproducing medium. This causes the signal light and the reference light to interfere with each other at the hologram recording/reproducing medium to form a diffraction grating (hologram) in the hologram recording/reproducing medium, so that the record data is recorded in the form of the diffraction grating (hologram).

A hologram reproducing device and a hologram reproducing method, used for reproducing the record data from the diffraction grating (hologram) recorded in this way, are proposed. In the device and method, when the diffraction grating (hologram) formed on the recording medium on which the recording has been performed is irradiated with reference light, diffraction light (that is, reproduction light) is generated. The reproduction light is detected by a light-receiving element to reproduce the record data.

Two types of recording/reproducing methods are proposed for generating the signal light and the reference light in such a recording operation and a reproducing operation. They are a two-beam interference recording/reproducing method and a collinear recording/reproducing method. In the two-beam interference recording/reproducing method, a path of the signal light and a path of the reference light are completely separately provided, whereas, in the collinear recording/reproducing method, the signal light and the reference light are disposed on the same axis and share one path. In the collinear recording/reproducing method, a reference-light pattern is formed at an outer peripheral portion of a spatial-light modulator (SLM) and a signal-light pattern is formed at an inner peripheral portion of the spatial-light modulator for recording on a recording medium. In addition, only the reference-light pattern is formed at the outer peripheral portion of the spatial-light modulator, and reproduction light is obtained from the recording medium on which the recording has been performed to reproduce record data (refer to, for example, U.S. Pat. No. 6,108,110 and Nikkei Electronics (P106 to 114 of the Jan. 17, 2005 issue).

A recording/reproducing optical unit 150, which is a main portion of a recording/reproducing device that performs a recording operation and a reproducing operation, is shown in FIG. 7. A transmissive collinear recording/reproducing method will be simply described with reference to the recording/reproducing optical unit 150 shown in FIG. 7.

Information is recorded in the following way. A light beam emitted from a laser light source 101 for recording and reproducing the information is incident upon a spatial-light modulator 103 through a collimator lens 102. The spatial-light modulator 103 spatially divides the light beam into light-beam portions, one portion becoming signal light 108 having a light-intensity modulation pattern reflecting record information and the other portion becoming reference light 109 which is not subjected to light intensity modulation or which is subjected to a particular light intensity modulation. These portions of the light beam reach an objective lens 104. That is, the collimator lens 102, the spatial-light modulator 103, and the objective lens 104 are disposed in a forward path that is a light-beam path extending from the laser light source 101 to a hologram recording/reproducing medium 307. For the spatial-light modulator 103, for example, a combination of a polarizing plate and an array liquid crystal panel is used. Since the signal light 108 and the reference light 109 pass through the same objective lens 104, the recording/reproducing method is called the collinear recording/reproducing method. The objective lens 104 causes the signal light 108 and the reference light 109 to form an interference fringe, that is, a hologram, at an information recording layer in the transmissive hologram recording/reproducing medium 307.

The information is reproduced in the following way. A light beam emitted from the laser light source 101 is transmitted through the collimator lens 102 and reaches the spatial-light modulator 103. The signal light 108 generated from the light beam is blocked by the spatial-light modulator 103 whose transmissivity is controlled to 0%, so that only the reference light 109 illuminates the recorded hologram through the objective lens 104. The light beam that has been diffracted by the hologram in the transmissive hologram recording/reproducing medium 307 passes through an objective lens 105 to form a reproduction image on an array light detector 106, where an array light-receiving element is disposed, and to detect a spatial distribution of light intensity of the reproduction image by the array light detector 106. Here, the array light detector 106 is, for example, a CCD sensor or a C-MOS sensor. The objective lens 105 is disposed in a backward path that is a light-beam path extending from the hologram recording/reproducing medium 307 to the spatial-light modulator 103.

In the collinear recording/reproducing method, the recording/reproducing optical unit may be a reflective type. FIG. 8 shows an example of a structure of a reflective recording/reproducing optical unit 151. Parts of the optical unit 151 having structural features and functions that are similar to those of the optical unit 150 shown in FIG. 7 will be given the same reference numerals and will not be described below. In a reflective collinear recording/reproducing method, a reflective hologram recording/reproducing medium 207 having a reflective film at the back of an information recording layer is used. Recording of information in the reflective type is substantially the same as that in the transmissive type. A difference is that signal light 108 and reference light 109 pass through a polarization beam splitter 110 and are converted into circularly-polarized lights by a ¼ wavelength plate 111 to form a hologram at the information recording layer in the hologram recording/reproducing medium 207 by an objective lens 104. The information is reproduced as follows. A light beam that has been diffracted and reflected by the hologram in the hologram recording/reproducing medium 207 passes through the objective lens 104, is converted into linearly-polarized light that is perpendicular to a forward path by the ¼ wavelength plate 111, and is reflected by the polarization beam splitter 110, so that a hologram image is formed on an array light detector 106 and a spatial distribution of light intensity of the reproduction image is detected by the array light detector 106. That is, a collimator lens 102, a spatial-light modulator 103, the polarization beam splitter 110, the ¼ wavelength plate 111, and the objective lens 104 are disposed in the forward path that is a light-beam path extending from the laser light source 101 to the hologram recording/reproducing medium 207. The objective lens 104, the ¼ wavelength plate 111, and the polarization beam splitter 110 are disposed in the backward path that is a light-beam path extending from the hologram recording/reproducing medium 207 to the spatial-light modulator 103. A recording/reproducing optical unit that does not use the ¼ wavelength plate 111 and that uses a beam splitter, instead of the polarization beam splitter 110, is known.

FIG. 9 shows an example of a pattern disposed at the spatial-light modulator 103 for splitting the signal light 108 and the reference light 109 transmitted through the spatial-light modulator 103 of the hologram recording/reproducing device. In general, a signal-light area 118 for generating the signal light 108 is disposed at an inner peripheral portion of the spatial-light modulator 103 where good optical performance is provided, a reference-light area 119 for generating the reference light 109 is disposed at an outer peripheral portion of the spatial-light modulator 103, and a gap is provided between the signal-light area 118 and the reference-light area 119.

To record a large amount of information on a hologram recording/reproducing medium, what is called multiplex recording for forming a plurality of holograms at the same location (or overlapping areas) of the hologram recording/reproducing medium may be performed. Various multiplex recording methods are proposed (refer to, for example, Nikkei Electronics (P106 to 114 of the Jan. 17, 2005 issue)).

In such collinear hologram recording/reproducing devices, in performing a reproducing operation, when the reference light is guided to the light detector, the reference light that is scattered in the backward path with respect to a hologram reproduction image having a very low light quantity becomes noise in the hologram reproduction image, thereby preventing stable hologram signal detection.

Accordingly, it is desirable to provide a hologram recording/reproducing device and a hologram reproducing device which make it possible to overcome the aforementioned problems to prevent reference light from being guided to a light detector and scattered reference light in a backward path from becoming noise in a hologram reproduction image.

SUMMARY OF THE INVENTION

According to an embodiment of the present invention, there is provided a hologram recording/reproducing device that records information onto a medium by a light beam emitted from a laser light source and passing through a forward path, and that reproduces the information recorded on the medium by the light beam passing through a backward path. The forward path has optical components disposed in an area extending from the laser light source to the medium, and the backward path has optical components disposed in an area extending from the medium to an array light detector. The hologram recording/reproducing device includes a spatial-light modulator, a first objective lens, a second objective lens, and a polarization-dependent diffraction element. The spatial-light modulator generates signal light and reference light from the light beam emitted from the laser light source, the signal light and the reference light being spatially divided from each other and having a common light path. The first objective lens focuses the signal light and the reference light traveling from the spatial-light modulator onto the medium. The second objective lens forms a hologram image on the array light detector based on reproduction light traveling from the medium. The polarization-dependent diffraction element is disposed in a real-image plane of a hologram and diffracts the reference light incident upon the array light detector from the second objective lens. The spatial-light modulator and the first objective lens are disposed in the forward path. The second objective lens and the polarization-dependant diffraction element are disposed in the backward path.

The hologram recording/reproducing device records information onto the medium by the light beam passing through the forward path having optical components disposed in an area extending from the laser light source to the medium. In addition, the hologram recording/reproducing device reproduces the information recorded on the medium by the light beam passing through the backward path having optical components disposed in an area extending from the medium to the array light detector. The spatial-light modulator is provided in the forward path. Therefore, it is possible to generate the reference light and the signal light, which have a common light path and are spatially divided, from the light beam emitted from the laser light source. In addition, the first objective lens is disposed in the forward path. Therefore, in a recording operation, it is possible to focus the reference light and the signal light traveling from the spatial-light modulator onto the medium to form a hologram. Further, in a reproducing operation, it is possible to focus the reference light traveling from the spatial-light modulator to generate reproduction light traveling from the medium. The second objective lens is disposed in the backward path. Therefore, it is possible to form a hologram image on the array light detector. In addition, the polarization-dependent diffraction element disposed in a real-image plane of the hologram is provided. Therefore, it is possible to diffract the reference light incident upon the array light detector from the backward-path objective lens to prevent unwanted reference light from impinging upon the array light detector.

According to another embodiment of the present invention, there is provided a hologram reproducing device that reproduces information recorded on a medium by irradiation with reference light emitted from a laser light source and passing through a forward path and by using a light beam passing through a backward path. The forward path has an optical component disposed in an area extending from the laser light source to the medium, and the backward path has optical components disposed in an area extending from the medium to an array light detector. The hologram reproducing device includes a first objective lens, a second objective lens, and a polarization-dependent diffraction element. The first objective lens is disposed in the forward path and focuses the reference light onto the medium. The second objective lens forms a hologram image on the array light detector based on reproduction light from the medium. The polarization-dependent diffraction element is disposed in a real-image plane of a hologram and diffracts the reference light incident upon the array light detector from the second objective lens. The second objective lens and the polarization-dependent diffraction element are disposed in the backward path.

In the hologram reproducing device, the information recorded on the medium is reproduced by irradiation with the reference light passing through the forward path, having an optical component disposed in an area extending from the laser light source to the medium, and by using the light beam passing through the backward path, having optical components disposed in an area extending from the medium to the array light detector. The first objective lens is disposed in the forward path. Therefore, it is possible to focus the reference light onto the medium to generate reproduction light traveling from the medium. The second objective lens is disposed in the backward path. Therefore, it is possible to form a hologram image on the array light detector. In addition, the polarization-dependent diffraction element disposed in a real-image plane of the hologram is provided. Therefore, it is possible to diffract the reference light incident upon the array light detector from the backward-path objective lens to prevent unwanted reference light from impinging upon the array light detector.

According to the embodiments of the present invention, it is possible to provide a hologram recording/reproducing device and a hologram reproducing device which make it possible to prevent reference light from being guided to the light detector and scattered reference light in the backward path from becoming noise and adversely affecting a hologram reproduction image.

BRIEF DESCRIPTION OF THE DRAWINGS

FIGS. 3A and 3B illustrate operations of a recording/reproducing optical unit according to the embodiment;

DETAILED DESCRIPTION

Hologram Recording/Reproducing Device

A recording/reproducing device that is described below can perform a recording operation and a reproducing operation. The recording/reproducing device includes a structural unit (recording unit) that contributes to performing the recording operation and a structural unit (reproducing unit) that contributes to performing the reproducing operation. A device including the recording unit is a hologram recording device and a device including the reproducing unit is a reproducing device. In the description below, these devices will be described as being in combination.

Figure 1:
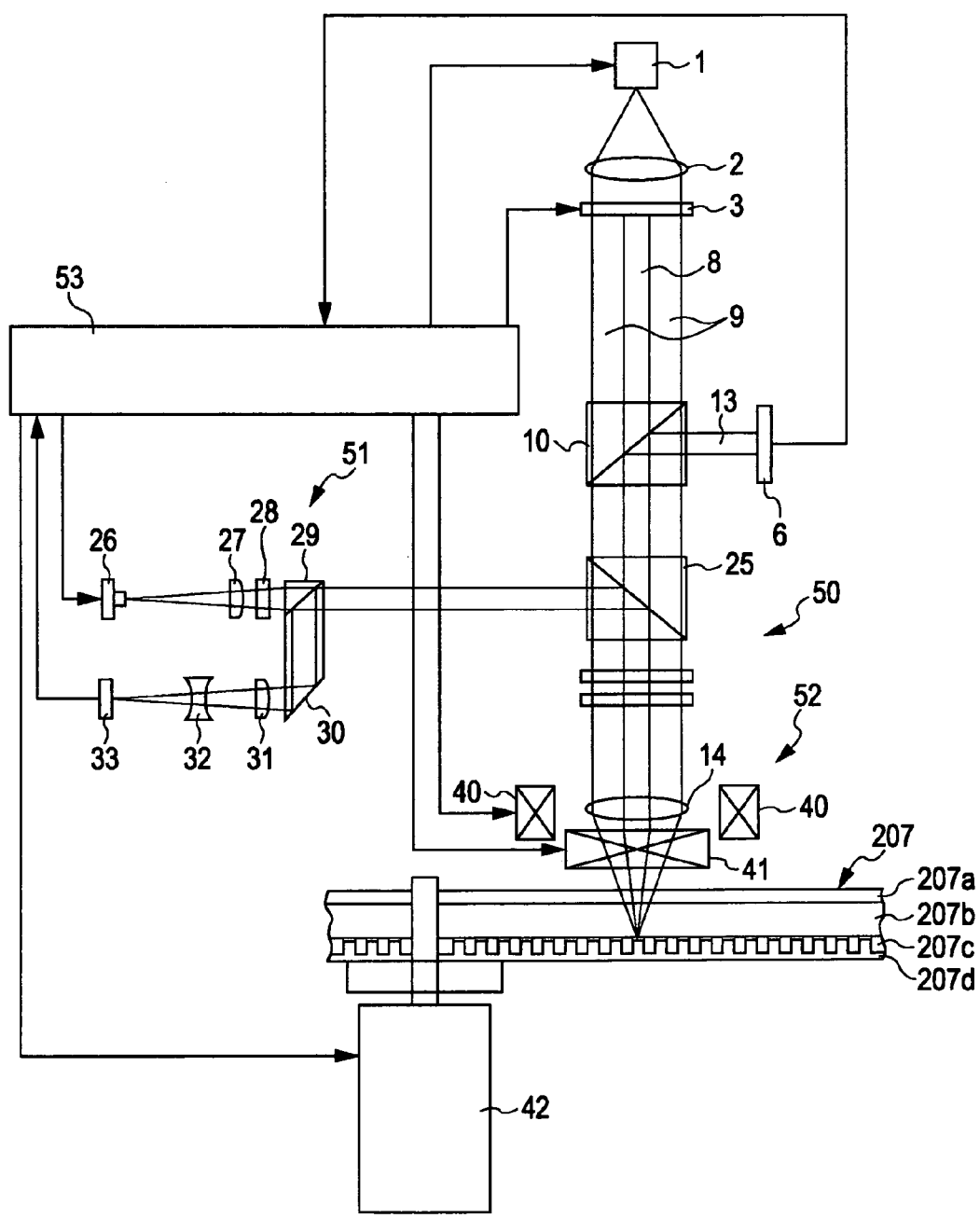
FIG. 1 shows a structure of a recording/reproducing device according to an embodiment.

A recording/reproducing device shown in FIG. 1 includes the following main structural units, that is, a recording/reproducing optical unit 50, a servo optical unit 51, a servo mechanical unit 52, and a signal processing/controlling unit 53.

The recording/reproducing optical unit 50 includes a structural unit contributing to a recording operation and a structural unit contributing to a reproducing operation. The structural unit contributing to a recording operation constitutes an optical device that records information onto a hologram recording/reproducing medium (that is, a recording optical unit of a hologram recording device). The structural unit contributing to a reproducing operation constitutes an optical device that reproduces the information from the hologram recording/reproducing medium (that is, a reproducing optical unit of a hologram reproducing device. In the description below, these devices will be described as being in combination.

The recording/reproducing optical unit 50 includes a recording/reproducing laser light source 1, a collimator lens 2, a spatial-light modulator 3, an array light detector 6, a polarization beam splitter 10, a polarization-dependent diffraction element 12, a ¼ wavelength plate 11, and an objective lens 14. A dichroic mirror 25 is an optical component that is used for sharing a light path with the servo optical unit 51 (described later). Accordingly, a recording operation or a reproducing operation can be carried out without the dichroic mirror 25.

Figure 9:
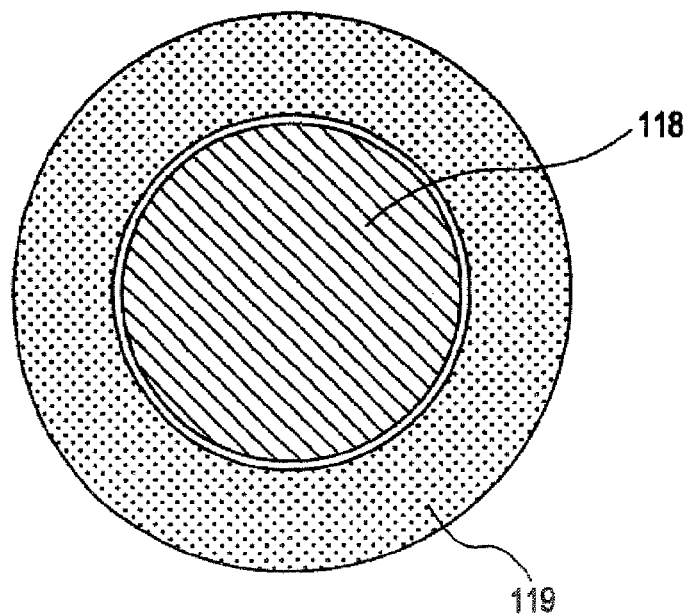
FIG. 9 shows an example of a pattern at a spatial-light modulator.

The laser light source 1 is, for example, a laser diode (LD) having a wavelength of 405 nm. The collimator lens 2 collimates a light beam emitted from the laser light source 1. The spatial-light modulator 3 is an optical element that spatially (two dimensionally) modulates signal light 8 on the basis of information (record data) and that spatially (two-dimensionally) modulates reference light 9 on the basis of a predetermined pattern. For example, a transmissive liquid crystal element is used for the spatial-light modulator 3. As in FIG. 9, a circular signal-light area 118 and a reference-light area 119, which is provided for the reference light and surrounds the signal-light area 118, are provided at the spatial-light modulator 3. The signal light 8 and the reference light 9 are separated from each other by the spatial-light modulator 3. When reproduction is performed, the circular signal-light area 118 is not used. At the spatial-light modulator 3, it is possible that an illumination area of the reference light be only specified, and the reference light not be spatially modulated on the basis of a predetermined pattern. In FIG. 1, the signal light and the reference light are provided with reference numerals 8 and 9, respectively, to roughly illustrate concepts thereof.

The polarization beam splitter 10 is an optical component that transmits a forward-path light beam with which a hologram recording/reproducing medium 207 is irradiated and guides a backward-path light beam, reflected from the hologram recording/reproducing medium 207, to the array light detector 6. Any optical component instead of the polarization beam splitter 10 may be used as long as the optical component has the same functions.

Figure 2:
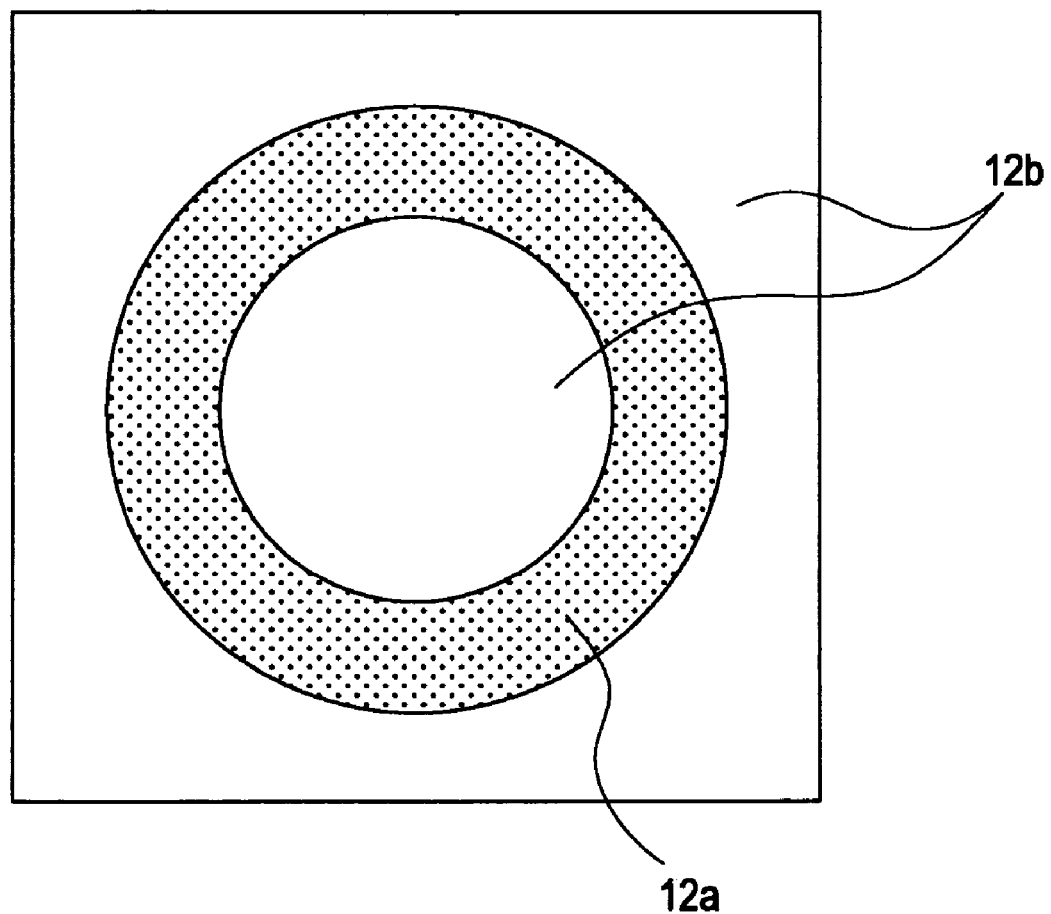
FIG. 2 shows a structure of a polarization-dependent diffraction element according to the embodiment.

The polarization-dependent diffraction element 12 is an optical component in which, whereas, one of the polarization components is not diffracted, the other polarization component that is perpendicular to the polarization component that is not diffracted is diffracted to provide ±1st order or higher order light resulting from maximally suppressing a 0th order diffraction light. The polarization-dependent diffraction element 12 is disposed at an anterior focus of the objective lens 14. Here, the polarization-dependent diffraction element 12 is a one-dimensional diffraction grating. FIG. 2 shows an example of a structure of the polarization-dependent diffraction element 12 according to the embodiment. A diffraction grating 12a is formed so as to include only the reference-light area. A portion 12b other than where the diffraction grating 12a is provided is a flat surface that is formed of a transparent material, such as glass or resin, so that signal light is transmitted therethrough in an ordinary manner.

The ¼ wavelength plate 11 converts a backward-path circularly-polarized light beam traveling from the hologram recording/reproducing medium 207 into a linearly-polarized light beam that is perpendicular to the direction of a forward-path linearly-polarized light beam. The objective lens 14 is a Fourier transformer lens. The array light detector 6 is a detector that detects a two-dimensional change in light quantity. For the array light detector 6, for example, a CCD sensor or a C-MOS sensor is used. When only a recording operation is performed, the array light detector 6 is not used.

That is, in the device shown in FIG. 1, the collimator lens 2, the spatial-light modulator 3, the polarization beam splitter 10, the dichroic mirror 25, the polarization-dependent diffraction element 12, the ¼ wavelength plate 11, and the objective lens 14 are disposed in a forward path that is a light-beam path extending from the laser light source 1 to the hologram recording/reproducing medium 207. The objective lens 14, the ¼ wavelength plate 11, the polarization-dependent diffraction element 12, the dichroic mirror 25, and the polarization beam splitter 10 are disposed in a backward path that is a light-beam path extending from the hologram recording/reproducing medium 207 to the array light detector 6.

After simply describing a recording operation by the recording/reproducing optical unit 50, a reproducing operation by the recording/reproducing optical unit 50 will be described while focusing on the polarization-dependent diffraction element 12, which is a characteristic portion, with reference to FIGS. 3A and 3B.

When the recording operation is to be performed, a light beam emitted from the laser light source 1 is collimated by the collimator lens 2, and the parallel light beam is incident upon the spatial-light modulator 3. The signal light 8 and the reference light 9 that have been generated by the spatial-light modulator 3 pass through the polarization beam splitter 10, the dichroic mirror 25, the polarization-dependent diffraction element 12, the ¼ wavelength plate 11, and the objective lens 14, so that the signal light 8 and the reference light 9 interfere with each other in the hologram recording/reproducing medium 207 to form a hologram.

Next, the reproducing of information will be described. A light beam emitted from the laser light source 1 passes through the collimator lens 2 and reaches the spatial-light modulator 3. The signal light 8 generated from the light beam is blocked by the spatial-light modulator 3 whose transmissivity is controlled to 0%, so that only the reference light 9 passes through the polarization beam splitter 10, the dichroic mirror 25, the polarization-dependent diffraction element 12, the ¼ wavelength plate 11, and the objective lens 14. Then, the reference light 9 illuminates the hologram recorded at the hologram recording/reproducing medium 207.

FIG. 3A schematically shows a state of light beams in the forward path in the reproducing operation. Here, linearly-polarized light that is incident upon the polarization-dependent diffraction element 12 is p-polarized light, so that the polarization-dependent diffraction element 12 is set in a direction in which the p-polarized light is not diffracted. In this case, the reference light 9 that has been transmitted through the polarization-dependent diffraction element 12 remains p-polarized light that is not diffracted. The p-polarized light passes through the ¼ wavelength plate 11, which is set at an angle of 45 degrees, and is converted into circularly-polarized light. The circularly-polarized light reaches the hologram recording/reproducing medium 207.

FIG. 3B schematically shows a state of light beams in the backward path in the reproducing operation. The reference light 9 and reproduction light 13 that have been reflected and diffracted by the hologram recorded at the hologram recording/reproducing medium 207 are circularly polarized light beams. They pass through the ¼ wavelength plate 11 and are converted into s-polarized light beams that are perpendicular to the incidence direction. Then, the s-polarized light beams are incident again upon the polarization-dependent diffraction element 12. Here, the reproduction light 13 that passes through the portion of the polarization-dependent diffraction element 12 that is not provided with the diffraction grating passes therethrough without being diffracted. In contrast, the reference light 9 that passes through the portion of the polarization-dependent diffraction element 12 that is provided with the diffraction grating is mostly diffracted as ±1st order light and changes its direction of travel. If the angle of diffraction of the ±1st order light is set sufficiently large, it is possible to detect only the reproduction light 13 by the light detector, without the ±1st order light, that is, the reference light 9, being introduced into the light path to the array light detector 6.

Hologram Recording/Reproducing Medium, Servo Optical Unit, Servo Mechanical Unit, and Signal Processing/Controlling Unit The hologram recording/reproducing medium 207, the servo optical unit 51, the servo mechanical unit 52, and the signal processing/controlling unit 53 will be simply described with reference to FIG. 1.

First, the hologram recording/reproducing medium 207 will be simply described.

The hologram recording/reproducing medium 207 is a disc-shaped medium, includes a protective layer 207a, a recording layer 207b, a groove 207c, and a reflective layer 207d, and is used to record an interference fringe, as a hologram, formed by the signal light 8 and the reference light 9. A boundary between the recording layer 207b and the groove 207c is provided with a dichroic film that reflects light from a hologram recording/reproducing light source and that transmits light from a servo light source. The protective layer 207a is a layer for protecting the recording layer 207b from the surrounding, and the recording layer 207b is used to record the interference fringe as a change in refractive index. If a material whose refractive index changes with the intensity of light is used, for example, lithium niobate ($LiNbO_3$) may be used as an inorganic material or, for example, a photopolymer may be used as an organic material. The refractive index of the recording layer 207b is changed in accordance with exposure amount, so that the interference fringe formed by interference between the reference light 9 and the signal light 8 can be recorded as a change in the refractive index on the hologram recording/reproducing medium 207.

Next, the servo optical unit 51 will be simply described.

The servo optical unit 51 shares the use of the objective lens 14 with the recording/reproducing optical unit 50. Therefore, the dichroic mirror 25, which is a wavelength selection element, is provided.

A servo light source 26 is a light source for performing servo control, such as a tracking servo control operation and a focus servo control operation, and for reading an address signal. The servo light source 26 emits laser light having a wavelength that differs from that of the laser light emitted from the laser light source 1. The servo light source 26 is a laser diode which uses an oscillation wavelength of, for example, 650 nm, to reduce sensitivity with respect to the recording layer 207b of the hologram recording/reproducing medium 207, so that it does not influence recording and reproducing operations and so that a servo signal is easily split.

A collimator lens 27 is an optical element that collimates the laser light emitted from the servo light source 26. A grating 28 is an optical element that splits the laser light that has exited from the collimator lens 27 into three light beams for servo control and for reading out an address signal.

A beam splitter 29 is an optical element that transmits the laser light that has exited from the grating 28 and that reflects returning light reflected by and returning from the hologram recording/reproducing medium 207. A mirror 30 is an optical element that reflects the returning light from the beam splitter 29 towards a light-receiving element 33.

A condenser lens 31 is an optical element that converges at the light-receiving element 33 the returning light from the mirror 30. A cylindrical lens 32 is an optical element that converts the light beam converged by the condenser lens 31 from a circular light beam to an elliptical light beam, for focus servo control. The light-receiving element 33 is an optical element that receives the returning light and outputs a tracking error signal for a tracking servo control operation, a focus error signal for a focus servo control operation, and an address signal. The light-receiving element 33 is, for example, a photodiode.

The servo mechanical unit 52 will be described.

The servo mechanical unit 52 includes a focus actuator 40 and a tracking actuator 41. The focus actuator 40 is a focus servo mechanism that drives the objective lens 14 perpendicularly to a surface of the hologram recording/reproducing medium 207 and controls the position of a spot of light that is focused by the objective lens 14. The tracking actuator 41 is a tracking servo mechanism that drives the objective lens 14 in a radial direction of the hologram recording/reproducing medium 207. The focus actuator 40 and the tracking actuator 41 perform a focus servo operation and a tracking servo operation, respectively, on the basis of a controlling operation by the signal processing/controlling unit 53. The servo mechanical unit 52 further includes a spindle motor 42 that rotates the hologram recording/reproducing medium 207.

The signal processing/controlling unit 53 will be described.

A calculating section including, for example, a central processing unit (CPU) and a digital signal processor (DSP) is a main portion of the signal processing/controlling unit 53. The signal processing/controlling unit 53 performs calculation as a result of receiving an electrical signal, to control the focus actuator 40, the tracking actuator 41, and the spindle motor 42.

In the foregoing description of the recording/reproducing optical unit 50, a recording/reproduction area on the hologram recording/reproducing medium 207 is specified to perform a recording and a reproducing operation. The specification of the recording/reproduction area is performed by the operations of the servo optical unit 51, the servo mechanical unit 52, and the signal processing/controlling unit 53. A spindle servo operation, a focus servo operation, a tracking servo operation, and signal processing, which are performed for specifying the recording/reproduction area, will hereunder be simply described.

First, a light beam emitted from the servo light source 26 is transmitted through the collimator lens 27, the grating 28, the beam splitter 29, the dichroic mirror 25, and the objective lens 14. Then, the light beam is reflected by the reflective layer 207d, where the groove 207c is formed, of the hologram recording/reproducing medium 207, is transmitted again through the objective lens 14, the dichroic mirror 25, and the beam splitter 29, and is transmitted through the mirror 30, the condenser lens 31, and the cylindrical lens 32, and reaches the light-receiving element 33. At this time, the light beam that is emitted from the servo light source 26 passes through the portion 12b that is disposed in correspondence with the central portion of the dichroic mirror 25 and the central portion of the polarization-dependent diffraction element 12. Accordingly, it is not influenced by the existence of the polarization-dependent diffraction element 12.

The light-receiving element 33 has divided optical detector portions, and generates an electrical signal in accordance with the quantity of light received by each optical detector portion. The calculating section including, for example, the central processing unit (CPU) and the digital signal processor (DSP) is a main portion of the signal processing/controlling unit 53. The signal processing/controlling unit 53 performs calculation as a result of receiving the electrical signal, to generate a focus error signal, which is used for performing a focus servo control operation, by an astigma method and to generate a tracking error signal, which is used for performing a tracking servo control operation, by a push-pull method. Then, the focus actuator 40 is controlled on the basis of the focus error signal, and the tracking actuator 41 and the spindle motor 42, used for rotating the hologram recording/reproducing medium 207, are controlled on the basis of the tracking error signal and an address decoded from the groove 207c. Thereafter, a predetermined record data is written as a hologram onto a predetermined area of the hologram recording/reproducing medium 207 to generate a reproduction signal from the hologram formed at the predetermined area of the hologram recording/reproducing medium 207.

The signal processing/controlling unit 53 controls the recording/reproducing optical unit 50 in both a recording operation and a reproduction operation. More specifically, when a writing operation is performed, a two-dimensional pattern based on information (record data) is displayed at the signal-light area 118 and the reference-light area 119 of the spatial-light modulator 3 on the basis of a signal from the signal processing/controlling unit 52, in accordance with the information (record data). When a reproduction operation is performed, a two-dimensional pattern for the reference-light area 119 is written to the spatial-light modulator 3 to process the output from the array light detector 6 by the signal processing/controlling unit 53.

Polarization-Dependent Diffraction Element

Figure 4:
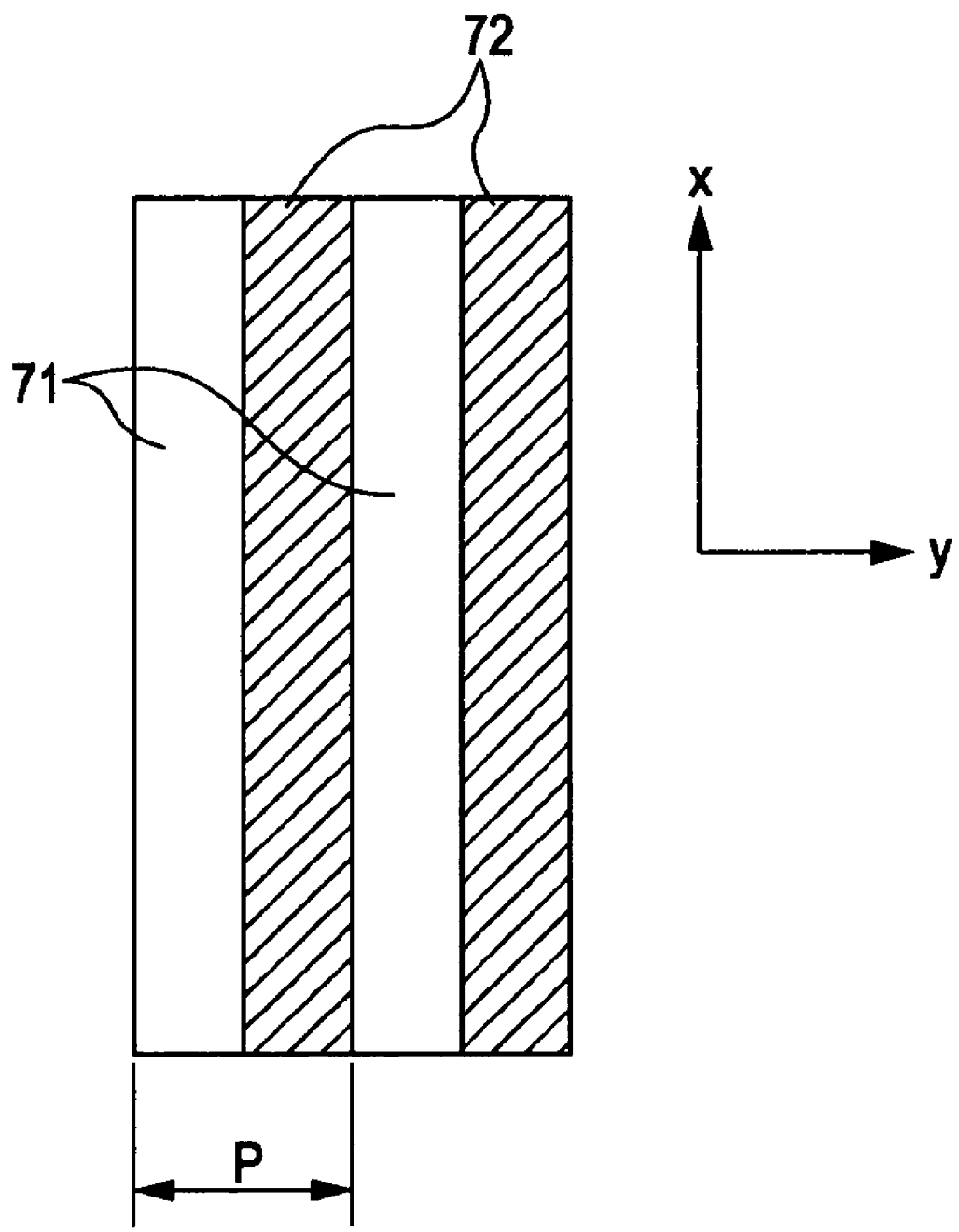
FIG. 4 illustrates the principle of the polarization-dependent diffraction element according to the embodiment.

Although the above-described polarization-dependent diffraction element 12 is described as being a one-dimensional polarization-dependent diffraction grating, it may have a structure other than a one-dimensional structure. Various diffraction grating patterns that provide the advantages to be accomplished are effective. The principle of a general polarization-dependent diffraction element that can be used in the embodiment will be explained. As shown in FIG. 4, in a diffraction grating in which media 71 and media 72 are alternately disposed, the conditions in the following Formula 1 with respect to an x direction and a y direction are to be satisfied in the embodiment. Here, nx1 represents a refractive index of each medium 71 in the x direction, nx2 represents a refractive index of each medium 72 in the x direction, ny1 represents a refractive index of each medium 71 in the y direction, ny2 represents a refractive index of each medium 72 in the y direction, $\Delta d$ represents a physical light-path difference between the media 71 and 72, and x represents a wavelength of a light source.

$$(nx1-nx2)\Delta d=0$$

$$(ny1-ny2)\Delta d=\pm \lambda/2 \quad (1)$$

Here, a diffraction angle is represented by the following Formula 2, where P represents a pitch.

$$\sin \theta = P/\lambda \quad (2)$$

Formula 1 provides conditions to be satisfied in terms of the optical light-path differences between the media 71 and 72. The light-path difference with respect to polarized light in the x direction is 0, that is, diffraction does not occur. In contrast, when the light-path difference with respect to polarized light in the y direction is ½ wavelength, a diffraction efficiency of 100% is provided. Here, when each medium 71 is an isotropic medium, that is, when nx1=ny1, each media 72 is a birefringent medium. Although, here, a light-path difference is provided in the y direction, it may be provided in the x direction instead, in which case the same conditions will be established as a result of only transposing the polarization directions for diffraction. The diffraction angle θ shown in Formula 2 is uniquely set by the pitch P (see FIG. 4) and the wavelength λ.

A polarization-dependent diffraction element based on such a principle may be actually fabricated as follows. When inorganic media are used, the polarization-dependent diffraction element can be fabricated by proton exchange of, for example, lithium niobate (LN) that is a uniaxial crystal and that has a refractive index no and a refractive index ne. In this case, the refractive index ne and the refractive index no of portions where the proton exchange is performed change and a dielectric grating is also used to achieve a birefringent element satisfying Formula 1 (refer to page 149, Introduction to Diffraction Optical Element, Optronics Co., Ltd.). In contrast, when organic media are used, for example, anisotropic liquid crystal molecules are aligned between, for example, isotropic media to produce a periodic structure having birefringence.

Figure 5A:
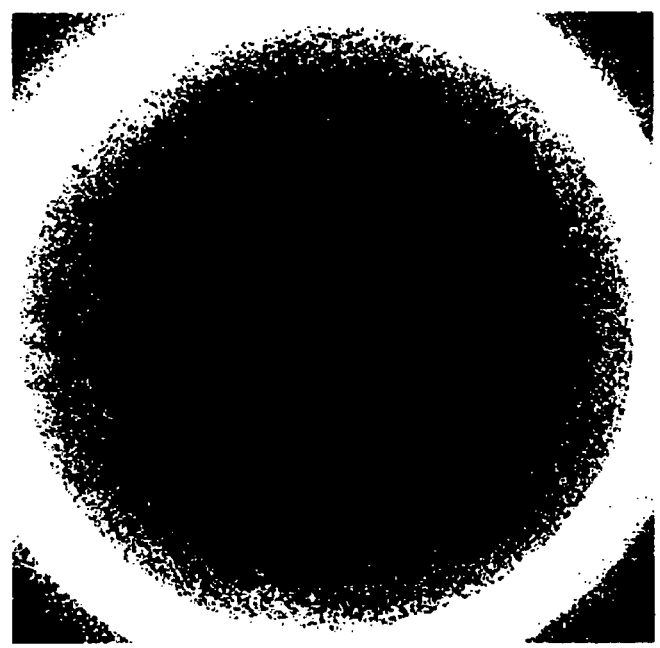
FIGS. 5A and 5B show an image at a spatial-light modulator according to the embodiment and an image at a related spatial-light modulator, respectively.
Figure 5B:
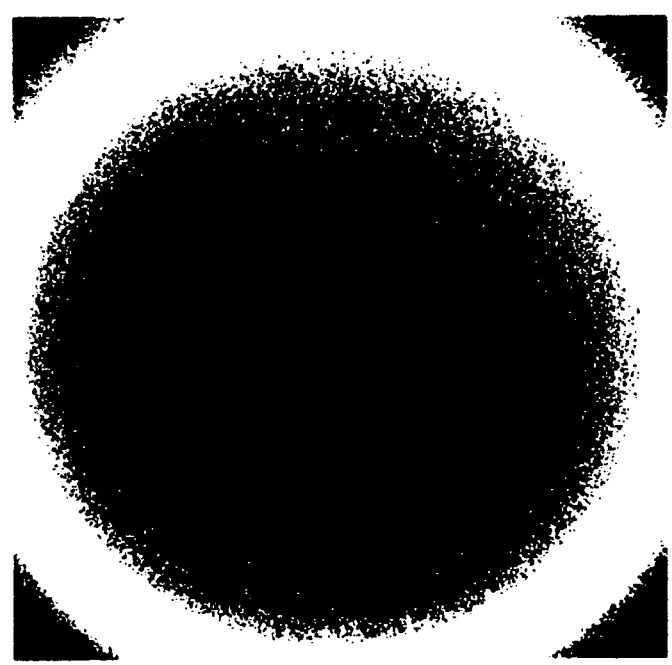

A trial production using organic media was actually performed, and the results of comparative experiments are shown in FIGS. 5A and 5B. FIG. 5A shows a reference-light image in the array light detector 6 when a polarization-dependent diffraction element is provided, and FIG. 5B shows a reference-light image in the array light detector 6 when a polarization-dependent diffraction element is not provided. When attention is paid to a reproduction-signal area (black spot at the center) that is formed when a polarization-dependent diffraction element is provided, it is confirmed that noise of scattered reference light (white circle) in FIG. 5A is less than that in FIG. 5B. Here, a 0th order light suppression ratio of diffraction light in the element that is used is ¼. If a polarization-dependent diffraction element having a characteristic that is closer to an ideal characteristic in which a 0th order light is 0% is used, the effect of reducing noise is further increased.

The location of the element is not limited to the aforementioned anterior focus of the objective lens 14. The same effect can be obtained by disposing the element in a return light path from a medium, a real-image plane of a reproduction hologram, etc., that is, at any location where reproduction light and reference light are separated from each other.

In the above-described hologram recording/reproducing device using the recording/reproducing optical unit 50 according to the embodiment, the reference light 9 passing through the diffraction grating 12a of the polarization-dependent diffraction element 12 is mostly diffracted as ±1st order light, and only the reproduction light 13 is detected by the array light detector 6. Therefore, in the case where a signal-to-noise (S/N) ratio of information in the reproduction light 13 is poor, for example, even if recorded information is detected from a signal having a low diffraction efficiency, it is possible to reproduce high-quality information. As a result, it is possible to increase the number of hologram multiplexings in the hologram multiplex recording method, so that higher-density hologram recording/reproducing operations are realized.

This applies not only to the above-described recording/reproducing device, but also to a hologram reproducing device that does not perform a recording operation and that uses the polarization-dependent diffraction element 12, which is the main portion in the embodiment. In such a hologram reproducing device, even if a signal-to-noise ratio (S/N) of information in the reproduction light 13 is poor, for example, even if recorded information is detected from a signal having a low diffraction efficiency, it is possible to reproduce high-quality information.

Other Embodiments

Figure 6:
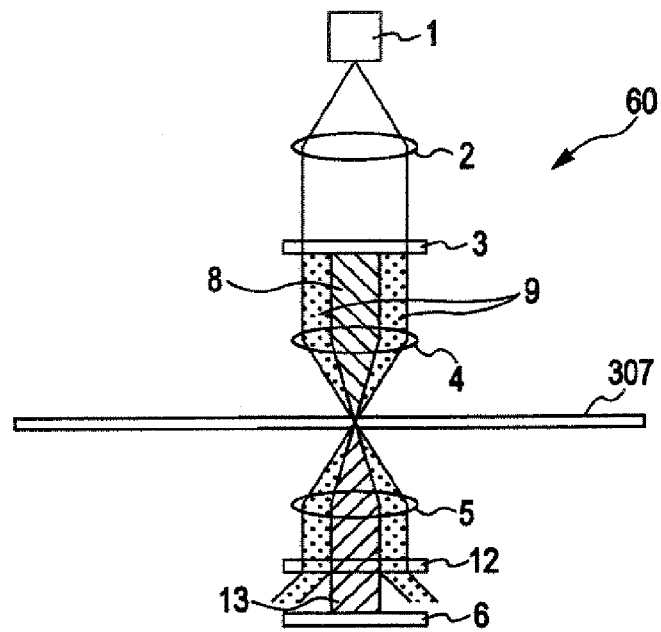
FIG. 6 shows a structure of a recording/reproducing optical unit according to another embodiment.
Figure 7:
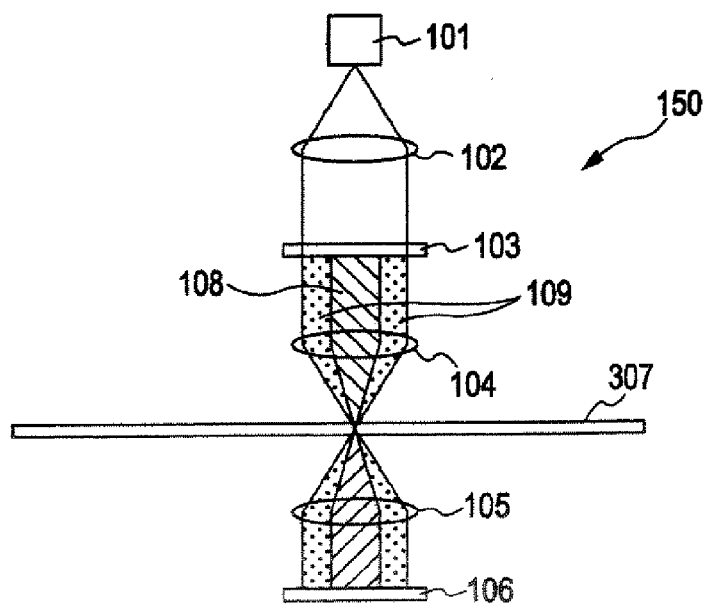
FIG. 7 shows a structure of a related recording/reproducing device.
Figure 8:
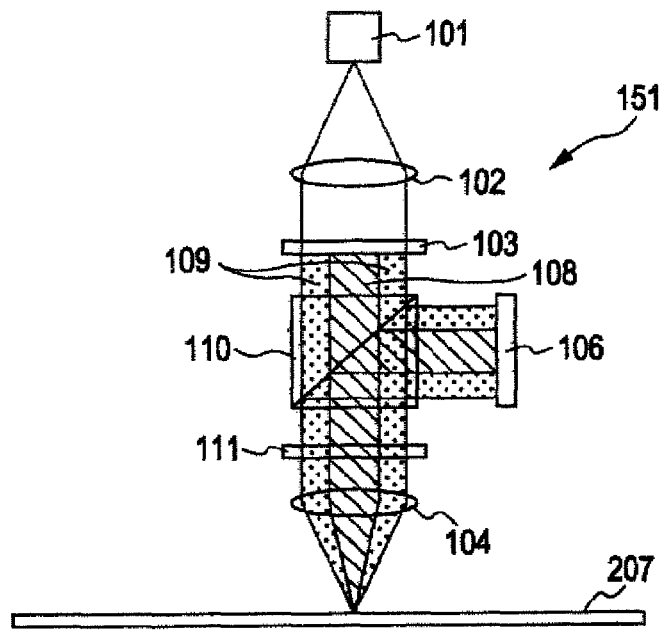
FIG. 8 shows a structure of another related recording/reproducing device.

A recording/reproducing optical unit 60, which is a main portion of a recording/reproducing device according to another embodiment, will be described with reference to FIG. 6. A servo optical unit, a servo mechanical unit, and a signal processing/controlling unit of the recording/reproducing device according to the another embodiment are almost the same as those in the previous embodiment, so that they will not be described below. Parts of the recording/reproducing optical unit 60 that have structural features and functions that are similar to those of the recording/reproducing unit 50 are given the same reference numerals and will not be described below.

The recording/reproducing optical unit 60 is a recording/reproducing optical component that makes it possible to use a transmissive hologram recording/reproducing medium 307 and that does not include a polarization beam splitter 10. In addition, an array light detector 6 is disposed at an opposite side of the transmissive recording/reproducing medium 307. The reason is as follows. When a reproducing operation is performed by the recording/reproducing optical unit 50, the light path of the reproduction light 13 provided by irradiating the reflective hologram recording/reproducing medium 207 with the reference light 9 is the same as the light path of the reference light 9. In contrast, when the transmissive hologram recording/reproducing medium 307 is used, reproduction light 13 is produced at the opposite side of the hologram recording/reproducing medium 307, so that the reference light 9 and the reproduction light 13 are not split by the polarization beam splitter 10. Further, two objective lenses, that is, a recording/reproducing objective lens 64, used in a recording operation and a reproducing operation, and a reproducing objective lens 61, used in a reproducing operation, are provided. A polarization-dependent diffraction element 12 is disposed in a real-image plane of a hologram that is reproduced.

In other words, a collimator lens 2, a spatial-light modulator 3, and the objective lens 64 are disposed in a forward path that is a light-beam path extending from a laser light source 1 to the hologram recording/reproducing medium 307. In addition, the reproducing objective lens 61 and the polarization-dependent diffraction element 12 are disposed in a backward path that is a light-beam path extending from the hologram recording/reproducing medium 307 to an array light detector 6.

Next, a recording operation by the recording/reproducing optical unit 60 will be described. A light beam emitted from the laser light source 1 is collimated by the collimator lens 2, and the parallel light beam is incident upon the spatial-light modulator 3. Signal light 8 and reference light 9, which are generated by the spatial-light modulator 3, pass through the recording/reproducing objective lens 64, and interfere with each other in the hologram recording/reproducing medium 307, so that a hologram is formed.

Information is reproduced in the following way. A light beam emitted from the laser light source 1 is transmitted through the collimator lens 2 and reaches the spatial-light modulator 103. The signal light generated from the light beam is blocked by the spatial-light modulator 3 whose transmissivity is controlled to 0%, so that only the reference light 109 passes through the objective lens 64 and illuminates the hologram recorded at the hologram recording/reproducing medium 307. Reproduction light 13 is generated by irradiating the hologram with the reference light 9, and the reference light 9 is also transmitted through the hologram recording/reproducing medium 307. Then, through the reproducing objective lens 61, a hologram image is detected by the array light detector 6 to reproduce the recorded information. Here, the polarization directions of the reproduction light 13 and reference light 9 with which the polarization-dependent diffraction element 12 is irradiated differ from each other. Since the polarization-dependent diffraction element 12 is disposed so that the reproduction light 13 is not diffracted and the reference light 9 is diffracted, the influence of the reference light 9 is eliminated at the array light detector 6.

Even in the recording/reproducing device using the recording/reproducing optical unit 60 according to the another embodiment, as in the previous embodiment, the reference light 9 passing through a diffraction grating 12a of the polarization-dependent diffraction element 12 is mostly diffracted as ±1st order light, and only the reproduction light 13 is detected by the array light detector 6. Therefore, in the case where a signal-to-noise (S/N) ratio of information in the reproduction light 13 is poor, for example, even if recorded information is detected from a signal having a low diffraction efficiency, it is possible to reproduce high-quality information. As a result, it is possible to increase the number of hologram multiplexings in a hologram multiplex recording method, so that higher-density hologram recording/reproducing operations are realized.

It should be understood by those skilled in the art that various modifications, combinations, sub-combinations and alterations may occur depending on design requirements and other factors insofar as they are within the scope of the appended claims or the equivalents thereof.

The invention claimed is:

1. A hologram recording/reproducing device that records information onto a medium by a light beam emitted from a laser light source and passing through a forward path, and that reproduces the information recorded on the medium by the light beam passing through a backward path, the forward path having optical components disposed in an area extending from the laser light source to the medium, the backward path having optical components disposed in an area extending from the medium to an array light detector, the hologram recording/reproducing device comprising:

a spatial-light modulator disposed in the forward path and adapted to generate signal light and reference light from the light beam emitted from the laser light source, the signal light and the reference light being spatially divided from each other and having a common light path;

a first objective lens disposed in the forward path and adapted to focus the signal light and the reference light traveling from the spatial-light modulator onto the medium;

a second objective lens disposed in the backward path and adapted to form a hologram image on the array light detector based on reproduction light traveling from the medium; and a polarization-dependent diffraction element disposed in the backward path and in a real-image plane of a hologram, the diffraction element being adapted to diffract the reference light incident upon the array light detector from the second objective lens.

2. The hologram recording/reproducing device according to claim 1, wherein the first objective lens and the second objective lens are defined by a single objective lens, the hologram recording/reproducing device further comprising a ¼ wavelength plate disposed between the diffraction element and the single objective lens, wherein the diffraction element, the single objective lens, and the ¼ wavelength plate are optical components that share the forward path and the backward path, the diffraction element transmits the signal light and the reference light traveling from the spatial-light modulator, which are linearly-polarized lights of a predetermined direction, without diffracting the signal light and the reference light, and the diffraction element diffracts the reference light traveling from the single objective lens, which is linearly-polarized light that is perpendicular to the predetermined direction.

3. The hologram recording/reproducing device according to either claim 1 or claim 2, wherein the diffraction element includes a diffraction grating making use of birefringence.

4. The hologram recording/reproducing device according to claim 3, wherein the diffraction element includes a diffraction grating formed of inorganic material.

5. The hologram recording/reproducing device according to claim 3, wherein the diffraction element includes a diffraction grating formed of organic material.

6. The hologram recording/reproducing device according to either claim 1 or claim 2, wherein the diffraction element is disposed near an anterior focal plane of the second objective lens.

7. A hologram reproducing device that reproduces information recorded on a medium by irradiation with reference light emitted from a laser light source and passing through a forward path and by using a light beam passing through a backward path, the forward path having an optical component disposed in an area extending from the laser light source to the medium, the backward path having optical components disposed in an area extending from the medium to an array light detector, the hologram reproducing device comprising:

a first objective lens disposed in the forward path and adapted to focus the reference light onto the medium;

a second objective lens disposed in the backward path and adapted to form a hologram image on the array light detector based on reproduction light from the medium; and a polarization-dependent diffraction element disposed in the backward path and in a real-image plane of a hologram, the diffraction element being adapted to diffract the reference light incident upon the array light detector from the second objective lens.

* * * * *